US008079088B2

(12) United States Patent
Murakami

(10) Patent No.: US 8,079,088 B2
(45) Date of Patent: Dec. 13, 2011

(54) INFORMATION PROCESSING APPARATUS, INFORMATION PROCESSING METHOD, AND PROGRAM

(75) Inventor: Hirofumi Murakami, Kanagawa (JP)

(73) Assignee: Sony Corporation (JP)

( * ) Notice: Subject to any disclaimer, the term of this patent is extended or adjusted under 35 U.S.C. 154(b) by 1030 days.

(21) Appl. No.: 11/985,624

(22) Filed: Nov. 16, 2007

(65) Prior Publication Data

US 2008/0148411 A1    Jun. 19, 2008

(30) Foreign Application Priority Data

Dec. 13, 2006   (JP) ............................. P2006-335572

(51) Int. Cl.
  *G06F 7/04* (2006.01)
(52) U.S. Cl. ............... 726/26; 726/27; 726/28; 726/29; 726/32; 726/33; 705/51; 705/57; 705/58; 705/902; 705/905
(58) Field of Classification Search .............. 726/26–35; 705/50–80, 901–912
  See application file for complete search history.

(56) References Cited

U.S. PATENT DOCUMENTS

| 4,120,030 A | * | 10/1978 | Johnstone | 713/190 |
|---|---|---|---|---|
| 4,203,166 A | * | 5/1980 | Ehrsam et al. | 380/45 |
| 4,238,854 A | * | 12/1980 | Ehrsam et al. | 713/165 |
| 4,386,234 A | * | 5/1983 | Ehrsam et al. | 380/281 |
| 4,433,207 A | * | 2/1984 | Best | 713/190 |
| 4,465,901 A | * | 8/1984 | Best | 713/190 |
| 4,757,534 A | * | 7/1988 | Matyas et al. | 705/56 |
| 4,850,017 A | * | 7/1989 | Matyas et al. | 380/280 |
| 4,908,861 A | * | 3/1990 | Brachtl et al. | 713/187 |
| 4,918,728 A | * | 4/1990 | Matyas et al. | 380/280 |
| 4,941,176 A | * | 7/1990 | Matyas et al. | 380/280 |
| 5,319,705 A | | 6/1994 | Halter et al. | |
| 5,367,621 A | * | 11/1994 | Cohen et al. | 715/209 |
| 6,185,734 B1 | * | 2/2001 | Saboff et al. | 717/164 |
| 6,205,445 B1 | * | 3/2001 | Tokuyama | 1/1 |

FOREIGN PATENT DOCUMENTS

| JP | 2002-215253 A | 7/2002 |
|---|---|---|
| JP | 2006-163896 A | 6/2006 |

OTHER PUBLICATIONS

"How to Update the Firmware on Any Hardware in Your Computer", Mar. 8, 2008, eHow.com, all pages, http://web.archive.org/web/20080308010954/http://www.ehow.com/how_2225435_update-firmware-any-hardware-computer.html.*

* cited by examiner

*Primary Examiner* — Andrew J. Fischer
*Assistant Examiner* — Calvin Cheung
(74) *Attorney, Agent, or Firm* — Lerner, David, Littenberg, Krumholz & Mentlik, LLP

(57) ABSTRACT

Disclosed herein is an information processing apparatus including: a unit information acquisition section; an identification information acquisition section; a secondary version information acquisition section; a comparison section; and an operation control section.

7 Claims, 7 Drawing Sheets

FIG. 3

UPDATE PROGRAM PACKAGE

| MODEL NAME |
| --- |
| PACKAGE VERSION |
| MASTER CODE |
| FIRST CPU UPDATE PROGRAM |
| SECOND CPU UPDATE PROGRAM |
| FPGA UPDATE PROGRAM |
| DSP UPDATE PROGRAM |

F I G. 4

| cpu_ver | pkg_ver | master_code |
|---|---|---|
| cpu_ver≦1.52 | 1.xx | #1 |
| 1.52<cpu_ver<1.70 | 2.xx | #2 |
| cpu_ver≧1.70 | 3.xx | #3 |

FIG.5A
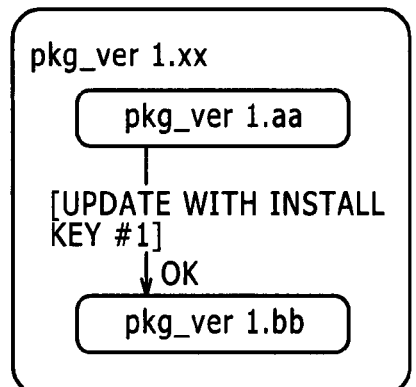
FIG.5B
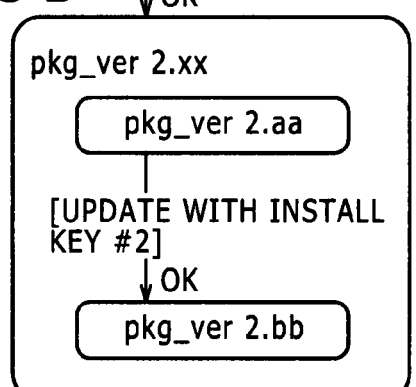
FIG.5C
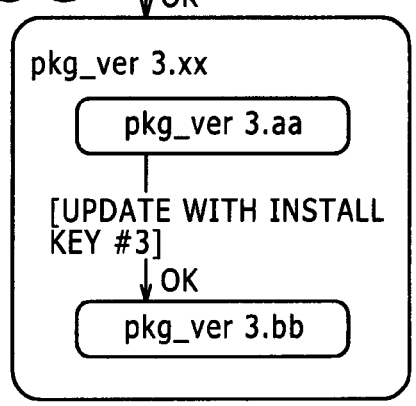
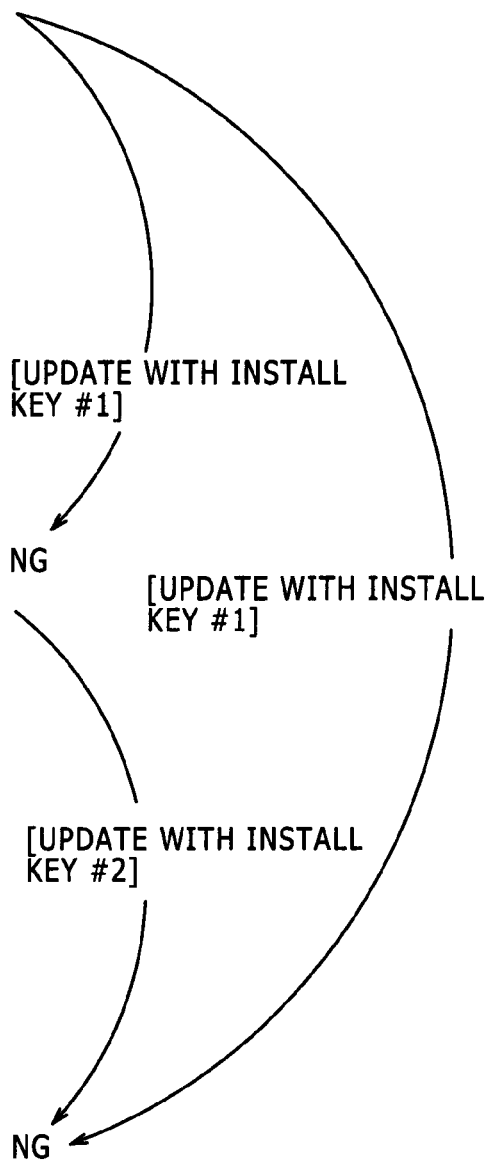

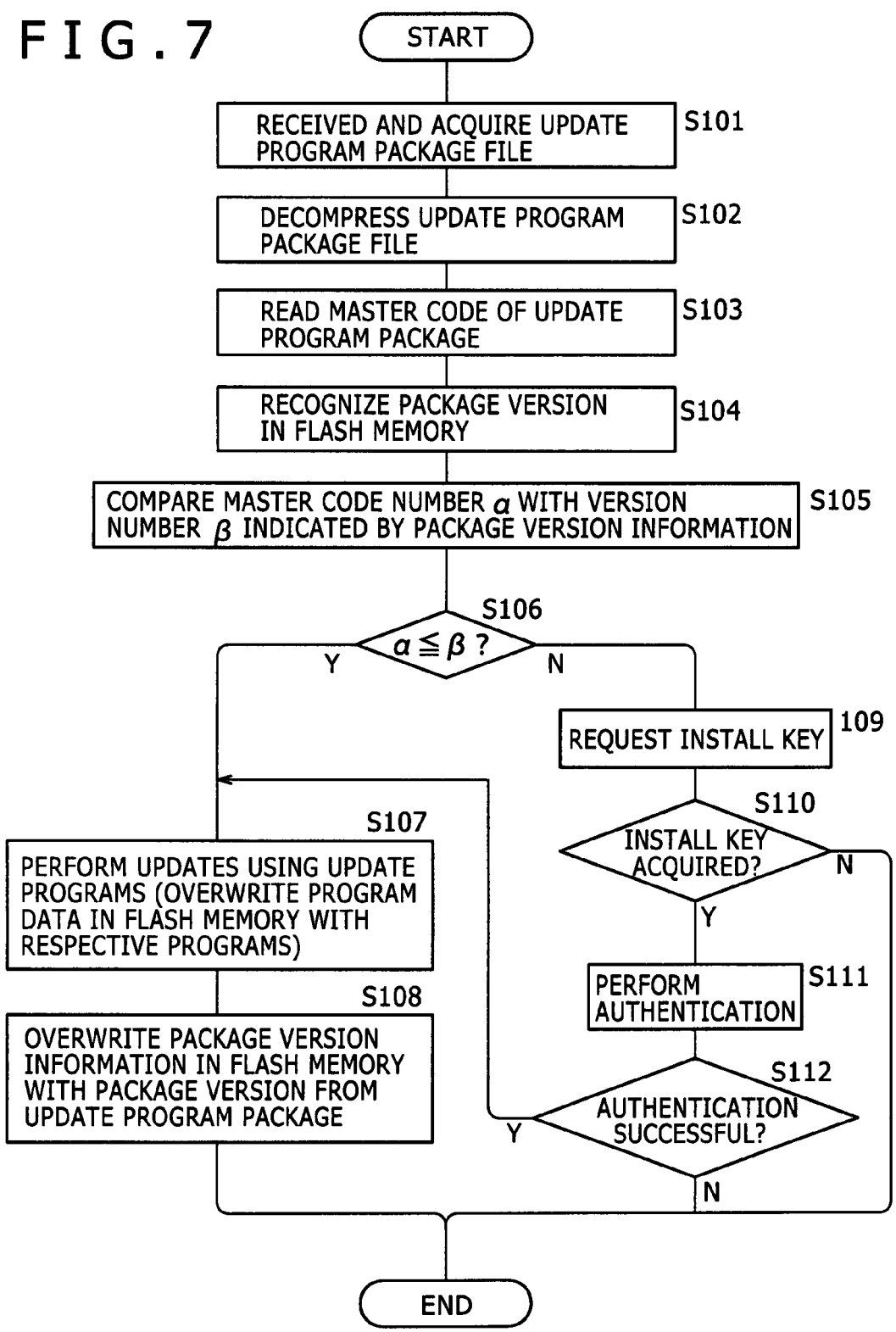

INFORMATION PROCESSING APPARATUS, INFORMATION PROCESSING METHOD, AND PROGRAM

CROSS-REFERENCE TO RELATED APPLICATIONS

The present application claims priority from Japanese Patent Application No. JP 2006-335572 filed in the Japanese Patent Office on Dec. 13, 2006, the entire contents content of which is incorporated herein by reference.

BACKGROUND OF THE INVENTION

1. Field of the Invention

The present invention relates to an information processing apparatus and an information processing method for carrying out data processing such as program installation (update) whereby data is stored anew, as well as to a program executed by such an information processing apparatus.

2. Description of the Related Art

Users of programs are frequently offered upgrade programs which will upgrade illustratively the functionality and performance of their apparatuses running on the existing programs and which may also fix bugs found in such programs. The currently installed program is upgraded after being replaced as a whole or patched up by a newly installed upgrade program. The new installation may be referred to as an update and the upgrade program as an update program or update data.

Usually, a chargeable program can be installed correctly only if an authentication password (also called an install key) is input following legitimate acquisition by the user. Where this type of program demanding the input of the install key upon installation is to be updated, the update may be carried out with or without another input of the install key. Whether or not to let the program be updated without the install key input is decided on by the program vendor after consideration of various circumstances.

SUMMARY OF THE INVENTION

For example, suppose that the user bought an install key in the past together with a program version 1.xx which was then installed and that the program vendor is now offering an upgrade to move the version number of the currently installed program to the next decimal fraction. In that case, the program vendor may let the user upgrade the existing program free of charge. If what the program vendor is offering is a major upgrade that will move the program number to the next integer (e.g., from 1.xx to 2.xx), then the program vendor may ask the user to purchase a new install key by which to install the upgrade program version 2.xx.

The present invention has been made in view of the above circumstances and provides arrangements for allowing the user to carry out such updates as easily and efficiently as possible.

In carrying out the invention and according to one embodiment thereof, there is provided an information processing apparatus including: a unit information acquisition section configured to newly acquire storage-ready unit information; an identification information acquisition section configured to extract and acquire version range identification information which is placed in a predetermined position inside a structure of the storage-ready unit information and which constitutes a code with a value unique to a given division of a version number range including the number of an actual version of the storage-ready unit information in which the version range identification information is stored; a secondary version information acquisition section configured to read and acquire from a predetermined storage section secondary version information which has a value unique to the given actual version number of the storage-ready unit information and which is currently stored in the predetermined storage section; a comparison section configured to compare the version range identification information acquired by the identification information acquisition section, with the secondary version information acquired by the secondary version acquisition section; and an operation control section configured to execute either of two operations based on what resulted from the comparison made by the comparison section, one of the two operations causing the storage-ready unit information newly acquired by the unit information acquisition section to be stored into the predetermined storage section, the other operation requesting input of key information for allowing the storage-ready unit information newly acquired by the unit information acquisition section to be stored into the predetermined storage section.

With the above structure in use, when the storage-ready unit information is to be newly acquired and stored into the storage section, a comparison is made between the version range identification information found in the newly acquired storage-ready unit information and the secondary version information stored as information related to currently stored storage-ready unit information. The version range identification information has the value corresponding to the range of the actual version number of the newly acquired storage-ready unit information, whereas the secondary version information has the value corresponding to the actual version of the currently stored storage-ready unit information. Thus the comparison between the two versions can at least determine whether the actual version of the currently stored storage-ready unit information is included in the range of the actual version of the newly acquired storage-ready unit information. Depending on the result of the comparison, the newly acquired storage-ready unit information is either stored immediately or authorized to be stored following the input of correct key information.

Where the arrangements above are in place and where a predetermined relation is found to exist between the actual version of the currently stored storage-ready and the actual version of the newly acquired storage-ready unit information, it is possible to store the newly acquired storage-ready unit information without demanding the input of key information.

According to one embodiment of the present invention outlined above, as long as a predetermined condition is met between the version of the currently stored storage-ready unit information and that of the newly acquired storage-ready unit information, the newly acquired storage-ready information can be stored without the need for key information input. For example, when the user performs operations to install the storage-ready unit information, there are appreciably fewer occasions on which to input key information than before. In other words, the user can install the storage-ready unit information in a simpler and more efficient manner than before.

BRIEF DESCRIPTION OF THE DRAWINGS

FIG. 3 is a schematic view showing a typical structure of an update program package corresponding to the embodiment;

FIG. 4 is a tabular view showing typical settings of package version and master code numbers with regard to CPU versions;

FIGS. 5A, 5B and 5C are schematic views explanatory of how the disk recording and reproducing apparatus of the embodiment is typically updated in programs;

FIG. 7 is a flowchart of steps constituting an update procedure carried out by the disk recording and reproducing apparatus of the embodiment.

DETAILED DESCRIPTION OF THE PREFERRED EMBODIMENT

Figure 1:
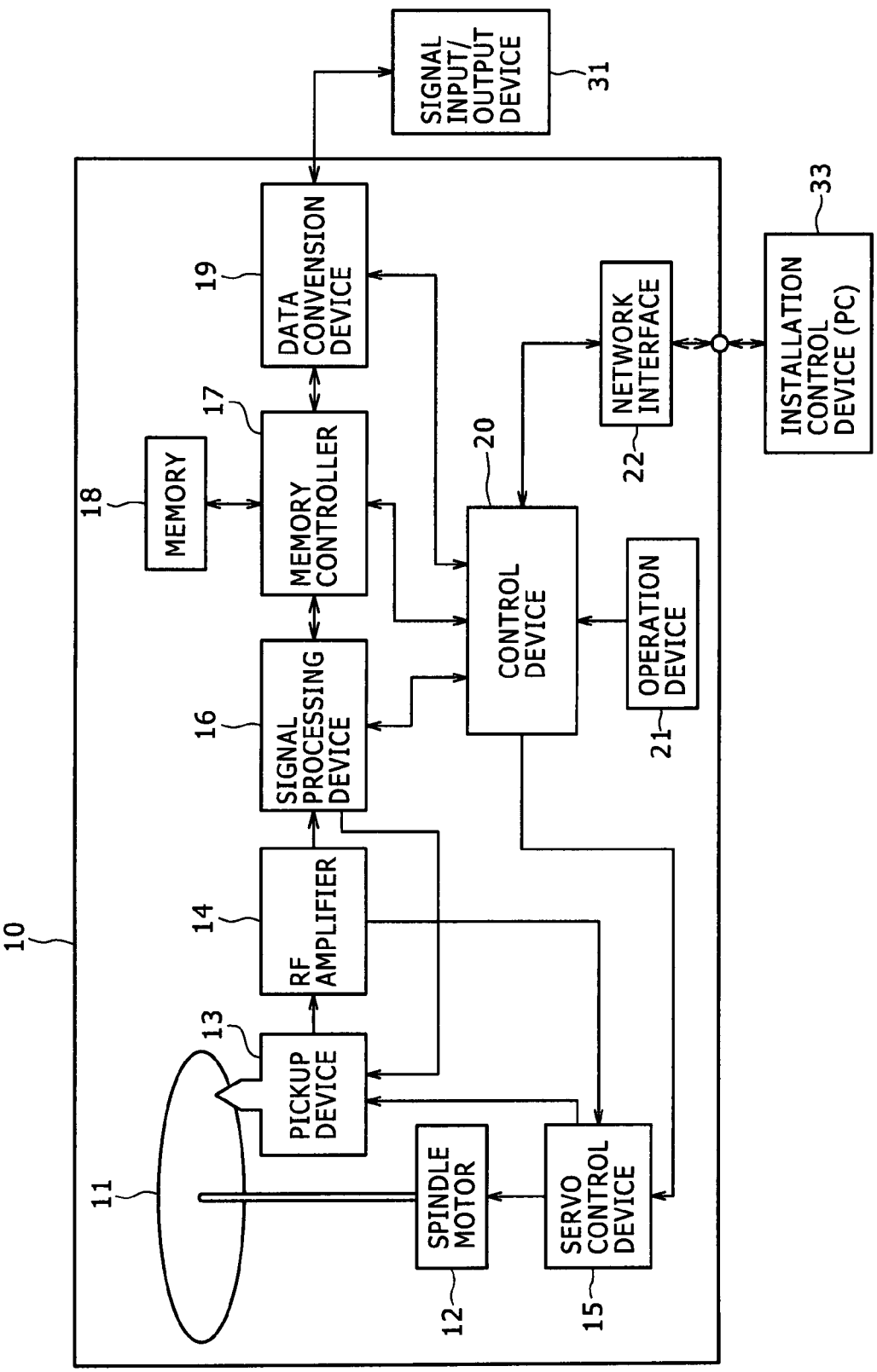
FIG. 1 is a block diagram showing a typical structure of a disk recording and reproducing apparatus practiced as an embodiment of the present invention.

FIG. 1 is a block diagram showing a typical structure of a disk recording and reproducing apparatus 10 practiced as one preferred embodiment (called the embodiment hereunder) of the present invention. The disk recording and reproducing apparatus 10 includes a recording control device structure that represents key features of the present invention. The disk recording and reproducing apparatus 10 also has functions of an editing device that edits video and audio information combining images and sounds synchronized for reproduction.

In FIG. 1, a spindle motor 12 rotates an optical disk 11 at CLV (constant linear velocity) or CAV (constant angular velocity) based on a spindle motor drive signal output by a servo control device 15.

A pickup device 13 emits a recording-use laser beam based on a recording signal supplied by a signal processing device 16, thereby recording signals to the optical disk 11. The pickup device 13 focuses the laser beam to a spot on the optical disk 11 and photoelectrically converts the reflected light coming from the optical disk 11 into an electrical current signal. The current signal thus generated is sent to an RF (radio frequency) amplifier 14. The spot of laser beam emission is controlled by servo control signals supplied from the servo control device 15 to the pickup device 13.

In keeping with the electrical current signal from the pickup device 13, the RF amplifier 14 generates a focus error signal, a tracking error signal, and a reproduction signal. The tracking error signal and focus error signal are input to the servo control device 15, and the reproduction signal is input to the signal processing device 16.

The servo control device 15 carries out servo controls such as focus servo control and tracking servo control. Illustratively, based on the focus error signal and tracking error signal coming form the RF amplifier 14, the servo control device 15 generates a focus servo control signal and a tracking servo control signal and outputs the generated signals to an actuator (not shown) of the pickup device 13. The servo control device 15 also generates the spindle motor drive signal for rotating the optical disk 11 at a predetermined velocity.

Furthermore, the servo control device 15 carries out sled control by which to move the pickup device 13 itself radially over the optical disk 11 so as to relocate the spot of laser beam emission on the disk surface. When a signal (i.e., data) is to be read from the optical disk 11, the position (i.e., address) from which to read the signal is designated by a control device 20. The spot of laser beam emission on the optical disk 11 is regulated partly under sled control and in such a manner that the signal may be read precisely from the designated read-out position.

At the timing of recording, the signal processing device 16 modulates record data coming from a memory controller 17 into a recording signal and feeds the signal thus generated to the pickup device 13. Upon reproduction, the signal processing device 16 demodulates a reproduced signal coming from the RF amplifier 14 into reproduced data that is forwarded to the memory controller 17.

Record data output by a data conversion device 19 is written by the memory controller 17 to a memory 18 as demanded for temporary storage. The memory controller 17 may later read the data from the memory 18 and output the retrieved data to the signal processing device 16. Reproduced data transferred from the signal processing device 16 is written by the memory controller 17 to the memory 18 for temporary storage as demanded. The memory controller 17 may later read the data from the memory 18 and output the retrieved data to the data conversion device 19.

From a signal input/output device 31, the data conversion device 19 receives video and audio information made up of images and sounds picked up by a video camera (not shown) and stored on its storage medium, or video and audio information reproduced by some other AV equipment out of its storage medium (not shown). The data conversion device 19 may compress as demanded the received information in a predetermined compression-encoding format and transfer the compression-encoded information to the memory controller 17.

The data conversion device 19 also receives reproduced audio and video data transferred from the memory controller 17. As demanded, the data conversion device 19 may decompress the received data into a video/audio signal in a suitable signal format and output the decompressed data to the signal input/output device 31.

The control device 20 carries out recording and reproducing operations by controlling the servo control device 15, signal processing device 16, memory controller 17, and data conversion device 19. Illustratively, the control device 20 may be structured as a microcomputer that includes a CPU and memory devices such as a ROM, a RAM and/or a flash memory.

An operation device 21 generically represents the controls, buttons, etc., furnished illustratively on the enclosure of the disk recording and reproducing apparatus 10, as well as an operation signal output device that generates operation signals denoting the operations performed on such controls, etc. The operation device 21 generates operation signals reflecting the operations performed on such controls, buttons, etc., and outputs the generated signals to the control device 20 (CPU).

The signal for recording video/audio data is handled by the above-described structure in the steps outlined below. Record data is first input from the signal input/output device 31 in the form of a video/audio signal. The video/audio signal conveying the record data is typically compression-encoded by the data conversion device 19. Under control of the memory controller 17, the encoded record data is written to the memory 18 for temporary storage and later read therefrom for output to the signal processing device 16. The record data input to the signal processing device 16 is modulated into a recording signal that is output to the pickup device 13. In turn, the pickup device 13 emits the laser beam onto the optical disk 11 for recording in a manner reflecting the recording signal that has been input.

At the time of reproduction, the signal stored on the optical disk 11 is retrieved by the pickup device 13 as an electrical current signal. The current signal is converted by the RF amplifier 14 into a reproduced signal in binarized form. The reproduced signal is demodulated by the signal processing device 16 into reproduced signal data representative of images and sounds. The reproduced signal data is then transferred to the memory controller 17. In turn, the memory controller 17 outputs the transferred reproduced signal data to the data conversion device 19 by way of the memory 18. The reproduced signal data input to the data conversion device 19 is illustratively decompressed into a video/audio signal in a suitable format, and the decompressed signal is output to the signal input/output device 31.

The data to be recorded to and reproduced from the optical disk 11 as described above is managed by a file system using a suitable file management method. The control device 20 controls the file system in keeping with suitable programs.

The disk recording and reproducing apparatus 10 embodying the present invention has a network interface 22 capable of network communications with external entities in accordance with network communication protocols. FIG. 1 shows an installation control device 33 that may be connected to this apparatus via a network compatible with the network interface 22. Typically, the installation control device 33 is a personal computer (PC). As such, the installation control device 33 retains data constituting an update program package, i.e., data by which to update currently installed programs in the disk recording and reproducing apparatus 10.

Figure 2:
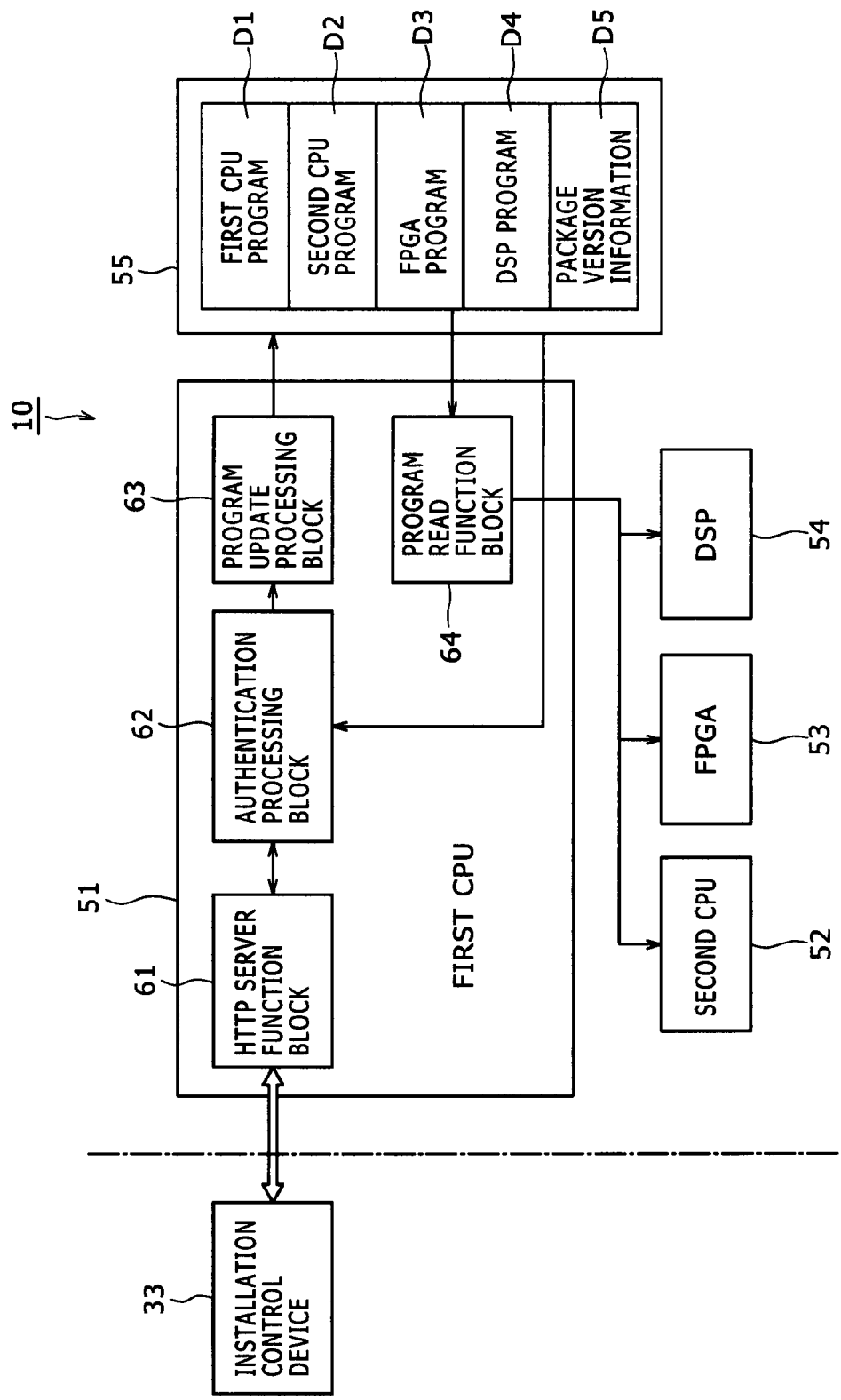
FIG. 2 is a block diagram highlighting major components related to program updates (i.e., installation) in the disk recording and reproducing apparatus embodying the invention.

FIG. 2 is a block diagram highlighting major components related to program updates (i.e., installation) in the disk recording and reproducing apparatus 10 of which the structure is shown in FIG. 1. The hardware structure shown in FIG. 2 includes a first CPU 51, a second CPU 52, an FPGA (field programmable gate array) 53, a DSP 54, and a flash memory 55. Of these hardware components in FIG. 2, the first CPU 51, second CPU 52, FPGA 53, and flash memory 55 are included in the corresponding control device 20 in FIG. 1. The DSP 54 in FIG. 2 is included in a video/audio data processing block exemplified by the signal processing device 16 in FIG. 1.

Illustratively, the first CPU 51 provides overall system control of the disk recording and reproducing apparatus 10 and functions as a primary control processing device. The second CPU 52 and FPGA 53 carry out control processes related to specific functions in conjunction with the first CPU 51. In this embodiment of the invention, the four hardware components above execute their respective programs so as to implement their respectively assigned features.

The flash memory 55 accommodates the data of the programs to be carried out by the above-mentioned hardware components. As shown in FIG. 2, the flash memory 55 stores a first CPU program D1, a second CPU program D2, an FPGA program D3, and a DSP program D4. With this embodiment, the flash memory 55 also retains package version information D5 along with the program data. As will be explained later, the package version information D5 denotes the value of the version number (package version) assigned to the package containing the four programs held in the flash memory 55.

FIG. 2 shows function blocks representing the processes related to updates (installation) and program execution carried out by the first CPU 51 using its program. The function blocks are constituted by an HTTP server function block 61, an authentication processing block 62, a program update processing block 63, and a program read function block 64.

The HTTP server function block 61 is a function block that enables the installation control device 33 connected via the network to operate the disk recording and reproducing apparatus 10 (control device 20) as an HTTP server. With this embodiment, the HTTP server function allows the installation control device 33 to offer a GUI (graphic user interface) made up of installation screens that will be discussed later in reference to FIGS. 6A through 6D. That is, the HTTP server function block 61 carries out update-related processes in response to requests coming from the installation control device 33 being operated for updates. As one of these processes, the HTTP server function block 61 illustratively creates Web page data constituting the installation screens of predetermined details in accordance with an installation procedure and transmits the generated Web page data to the installation control device 33.

FIG. 3 is a schematic view showing a typical structure of an update program package. As described above in reference to FIG. 2, it takes four programs to operate the disk recording and reproducing apparatus 10: first CPU program D1, second CPU Program D2, FPGA program D3, and DSP program D4. The update program package is a package that integrates four update programs for updating the above four component programs to a predetermined version each.

A header of the structure shown in FIG. 3 contains at least information indicative of a model name, a package version, and a master code. The model name represents the model of the apparatus whose currently installed programs are to be upgraded by this update program package (which contains this model name). A model name field accommodates the information indicative of the model name.

The package version (secondary version information) denotes the version number assigned to this update program package and presented to the user. With this embodiment, as can be understood from the foregoing explanation, the package version is different from the version of each of the update programs that make up this update program package. The version of each update program is called a CPU version (actual version) as it corresponds to each of the hardware components (i.e., CPU) in which the program in question is installed.

The package version information D5 stored in the flash memory 55 of FIG. 2 holds the same package version as that of the update program package constituted by the currently installed programs, i.e., first CPU program D1, second CPU program D2, FPGA program D3, and DSP program D4, in the disk recording and reproducing apparatus 10. That is, the package version information in the flash memory 55 indicates the version of the program package currently installed in the disk recording and reproducing apparatus 10.

The master code (version range identification information) refers to the code number that is set corresponding to the CPU versions of the update programs constituting this update program package, the code number being set for a given range of CPU version numbers of update programs. Typical code number settings of the master code will be discussed later in reference to FIG. 4.

The header containing the model name, package version, and master code in the package structure is followed by the update programs: a first CPU update program prepared for the first CPU program D1, a second CPU update program for the second CPU program D2, an FPGA update program for the FPGA program D3, and a DSP update program for the DSP program D4.

The programs included in the update program package are constituted by binary data. In like manner, the other information including the model name, package version and master code is also in binary form for this embodiment of the invention. With all data in the update program package offered in the same binary form, the process in which to have the disk recording and reproducing apparatus 10 install (i.e., update) its programs becomes less onerous because binary data need only be handled.

FIG. 4 is a tabular view showing typical settings of package version and master code number with regard to CPU versions. In this table, the CPU version number is represented by "cpu_ver," package version number by "pkg_ver," and master code number by "master_code." It is assumed for this embodiment that the CPU version numbers ("cpu_ver") range at least from 1.52 to 1.70. The version number range is further divided into three subordinate ranges: "cpu_ver≦1.52," "1.52<cpu_ver<1.70," and "cpu_ver≧1.70." Such divisions are predicated on the assumption that the program with its version number falling within the range of "1.52<cpu_ver≦1.70" offers updates of major functions over the preceding program whose version number falls within the range of "cpu_ver≦1.52," and that the program with its version number falling within the range of "cpu_ver≧1.70", provides updates of major functions over the preceding program whose version number falls within the range of "1.52<cpu_ver<1.70."

The CPU version ranges established as described above are associated with corresponding package versions illustratively as follows: the CPU version range of "cpu_ver≦1.52" is made to correspond to the package version of "pkg_ver=1.xx," the range of "1.52<cpu_ver<1.70" to the package version of "pkg_ver=2.xx," and the range of "cpu_ver 1.70" to the package version of "pkg_ver=3.xx." The decimal fraction (xx) of the package version (pkg_ver) need not coincide with the decimal fraction of each CPU version (cpu_ver). Still, the decimal fractions are preferably determined so that one "cpu_ver" number is associated with a corresponding "pkg_ver" number. For example, if the CPU version of "cpu_ver=1.52" is immediately followed by that of "cpu_ver=1.53," then the package version of "pkg_ver=2.01" corresponding to the CPU version of "cpu_ver=1.52" may be immediately followed by the package version of "pkg_ver=2.02" associated with the CPU version of "cpu_ver=1.53."

The master code number may be established as shown in the table. Typically, the master code number of "master_code=#1" is set for the range of "cpu_ver≦1.52," "master_code=#2" for the range of "1.52<cpu_ver<1.70," and "master_code=#3" for the range of "cpu_ver≦1.70." The master code of "master_code=#1" is associated with the package version of "pkg_ver=1.xx," "master_code=#2" with "pkg_ver=2.xx," and "master_code=#3" with "pkg_ver=3.xx." That is, the integers of the master code numbers coincide with those of the package version numbers.

The version of the programs presented to the user of the disk recording and reproducing apparatus 10 is the package version (pkg_ver) of the update program package, as mentioned above. How updates are carried out by the embodiment depending on the package version will be discussed below in reference to FIGS. 5A through 5C.

FIG. 5A schematically shows how the program package with the package version of "pkg_ver=1.xx" is installed in the disk recording and reproducing apparatus 10. If the version of the currently installed package is "pkg_ver=1.aa" and if that version is to be updated to "pkg_ver=1.bb (aa<bb)," then the update program package with the package version of "pkg_ver=1.bb" is acquired and installed. At this point, an install key #1 is used to install the update program package having the package version of "pkg_ver=1.cd."

The install key is key information used for authentication purposes upon program installation. If the program package with the package version of "pkg_ver=1.xx" is currently installed, then the user already possesses the install key #1 legitimately. That is, the update from "pkg_ver=1.aa" to "pkg_ver=1.bb" shown in FIG. 5A is carried out using the install key already in the user's possession; there is no need to acquire a new install key. With this embodiment of the invention, if the program package having the package version of "pkg_ver=1.xx" is currently installed and if the version number of an update merely increases to the next decimal fraction, there is no need to obtain any new install key.

If the program package with the package version of "pkg_ver=1.xx" shown installed in FIG. 5A is to be updated to "pkg_ver=2.xx" as indicated in FIG. 5B, then the installation may not be performed by use of the install key #1. To make an update up to "pkg_ver=2.xx" involves having the user employ an install key #2 upon installation of the update program package with the package version of "pkg_ver=2.xx." An attempt to install the update program package with the package version of "pkg_ver=2.xx" using the install key #1 will not bring about successful installation, as will be discussed later. Instead, the installation control device 33 displays an operation screen requesting the input of a legitimate install key.

The install key #2 is typically distributed at cost by the vendor of update program packages. The user is to pay for the install key #2 when updating the program package from "pkg_ver=1.xx" to "pkg_ver=2.xx."

When making a further update from the updated environment of FIG. 5B in which the package version is "pkg_ver=2.aa," to the package version of "pkg_ver=2.bb," the user may employ the install key #2 to install the update program package. That is, where the version number falls within the range of "pkg_ver=2.xx," the update is made possible by use of the install key #2. That means the user has no need to pay for the update.

If an update is to be made from the updated environment of FIG. 5B in which the package version is "pkg_ver=2.xx," to the package version of "pkg_ver=3.xx," in FIG. 5C, then the install key #2 (as well as the install key #1) is not sufficient, and an install key #3 needs to be employed. Illustratively, for an update from "pkg_ver=1.xx" or "pkg_ver=2.xx" to "pkg_ver=3.xx," the user needs to obtain the install key #3 by purchasing it.

Thereafter, when making an update from the updated environment of FIG. 5C in which the package version is "pkg_ver=3.aa," to the package version of "pkg_ver=3.bb" (i.e., for an update within the version range represented by "pkg_ver=3.xx"), the user can employ the previously purchased install key #3 to install the update program package.

This embodiment, as described above, demands the use of a new install key whenever the package version (pkg_ver) of the update program package increases to the next integer. Each install key is typically distributed at cost. On the other hand, if the package version of the update program package increases to the next decimal fraction while the integer part remains the same, the existing install key corresponding to that integer can be used to install the package in question.

FIGS. 6A, 6B, 6C and 6D are schematic views showing typical user interface screens displayed as an installation dialog 100 on the monitor of the installation control device 33 in response to operations performed by the user to update (i.e., install) programs in the disk recording and reproducing apparatus 10. As mentioned above, the installation dialog 100 is implemented by the disk recording and reproducing apparatus 10 which is connected to the installation control device 33 via the network and which transmits Web page data under HTTP using the HTTP server function of the HTTP server function block 61. The installation control device 33 reproduces the transmitted Web page data using Web browser application software for display on the monitor screen.

The user obtains the update program package preparatory to updating the programs in the disk recording and reproducing apparatus 10. The update program package may be distributed illustratively by the vendor setting up on the network a server to which to upload program packages. Using a network function of the installation control device 33 (PC), the user may access the server and download the update program package therefrom. Alternatively, the vendor may distribute removable storage media each carrying the update program package. The user may acquire one such storage medium and have the update program package retrieved therefrom by the installation control device 33.

The user then sets up the installation control device 33 and disk recording and reproducing apparatus 10 in such a manner that both are communicably interconnected via the network. In this setup, the installation control device 33 works as a controller enabling the disk recording and reproducing apparatus 10 to install programs. When the user performs operations on the installation control device 33 to start installing the update program package, the monitor of the device 33 displays the installation dialog 100 together with messages and buttons shown in FIG. 6A.

Figure 6A:
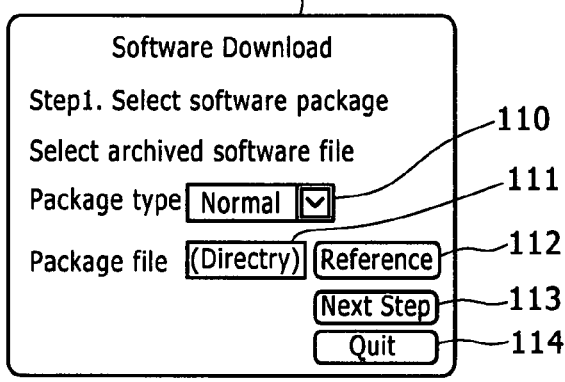
FIGS. 6A, 6B, 6C and 6D are schematic views showing typical user interface screens that appear when an update program is installed.

The dialog screen of FIG. 6A may typically prompt the user to designate, from among the files held by the installation control device 33, those which constitute the update program package in question. Illustratively, the dialog screen includes a package type input box 110 to which to input a package type and a directory input box 111 in which to specify the location (i.e., directory) of the update program package. Also displayed on the dialog screen is a Reference button 112 used to search for the directory (path) to be input to the directory input box 111, along with a Next Step button 113 and a Quit button 114.

The user makes entries into the package type input box 110 and directory input box 111, selects the update program package to be used for the upgrade this time, and operates on the Next Step button 113.

Figure 6B:
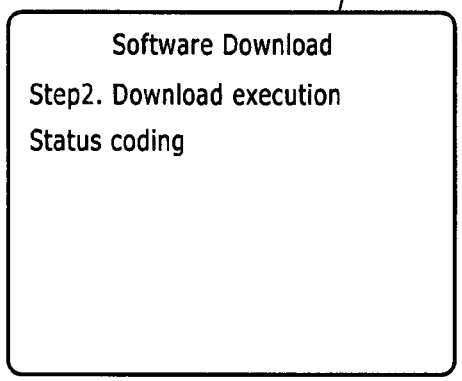
Figure 6D:
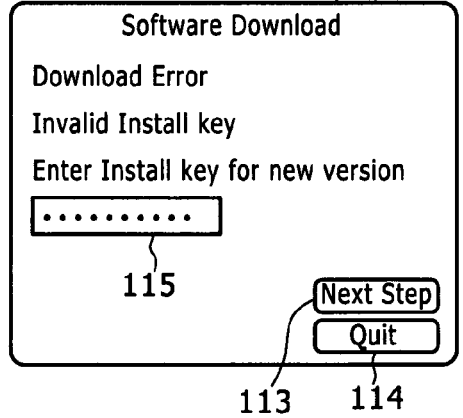

With the buttons operated on the screen of FIG. 6A, either the screen of FIG. 6B or that of FIG. 6D is reached depending on the relation between the package version of the currently installed program package in the disk recording and reproducing apparatus 10 and the package version of the update program package for the upcoming update.

More specifically, if the integer in the package version "pkg_ver" of the update program package to be installed is equal to or smaller than the integer in the package version "pkg_ver" of the currently installed program package in the disk recording and reproducing apparatus 10, then the screen of FIG. 6B appears.

The installation dialog 100 of FIG. 6B shows that the disk recording and reproducing apparatus 10 is carrying out the update by installing the update program package. Whereas it was explained above in reference to FIGS. 5A through 5C that an update demands the use of the install key corresponding to the integer in the package version, the transition from FIG. 6A to FIG. 6B does not involve any operations associated with install keys.

As explained above in reference to the drawings, if the integer in the package version of the currently installed package is the same as the integer in the package version of the update program package to be installed, then the necessary install key is assumed to be already in the user's possession. On that assumption, the entry of the same install key is redundant and thus omitted. This alleviates the workload on the user doing chores upon program installation.

Figure 6C:
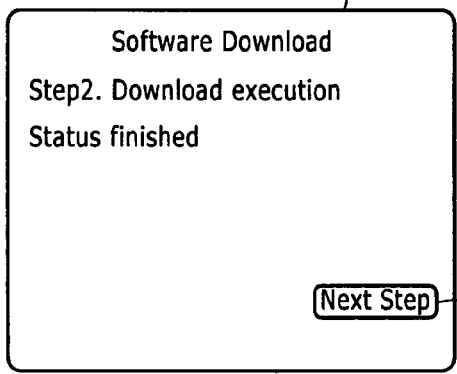

When installation (i.e., update) of the update program package is completed on the disk recording and reproducing apparatus 10, the installation dialog 100 switches from FIG. 6B to FIG. 6C. The latter screen indicates completion of the update.

Meanwhile, if the integer in the package version "pkg_ver" of the update program package to be installed shortly is larger than the integer in the package version "pkg_ver" of the currently installed program package in the disk recording and reproducing apparatus 10, then the screen of FIG. 6D appears.

As explained in reference to FIGS. 5A through 5C, if the package version number increases to the next integer, the install key acquired previously along with the currently installed program package in the disk recording and reproducing apparatus 10 may not be used for the update. A new install key is demanded.

In that case, the installation dialog 100 appears in the form of a key input request screen shown in FIG. 6D prompting the user to input the install key corresponding to the update program package to be installed.

If the user is already in possession of the install key applicable to the update program package, then the user need only input the install key in question to an install key input box 115 on the screen of FIG. 6D, before operating the Next Step button 113. In turn, the update program package starts getting installed, and the installation dialog 100 of FIG. 6B is now displayed. Unless and until the correct install key is entered into the install key input box 115, the update program package will not be installed.

FIG. 7 is a flowchart of steps constituting an update procedure performed by the disk recording and reproducing apparatus 10 of this embodiment. The procedure of FIG. 7 is carried out illustratively by the first CPU 51 in FIG. 2 using the functions of the HTTP server function block 61, authentication processing block 62, program update processing block 63, and program read function block 64. More specifically, this procedure is performed by the first CPU 51 executing the first CPU program D1.

Illustratively, the disk recording and reproducing apparatus 10 causes the HTTP server function block 61 to display the installation dialog 100 shown in FIG. 6A. In this installation dialog 100, as discussed above, the user is prompted to designate the directory (i.e., storage location) of the update program package for upgrading the disk recording and reproducing apparatus 10, before operating the Next Step button 113. In turn, the installation control device 33 reads from the designated directory the update program package in file form and transmits the data making up the package to the disk recording and reproducing apparatus 10 over the network.

In step S101 of FIG. 7, the disk recording and reproducing apparatus 10 receives and acquires the data of the update program package in files having been transmitted. The received package data is stored illustratively into a RAM (not shown) inside the control device 20.

With this embodiment, the update program package is distributed in a predetermined compressed file format. The update program package sent from the installation control device 33 is also in this compression file format. In step S102, the received update program package is decompressed. The decompressed update program package is stored illustratively into the RAM.

The decompressed update program package held in the RAM illustratively has the structure shown in FIG. 3. In step S103, the master code is read from that structure of the update program package and written illustratively to a register.

In step S104, the package version information is read from the flash memory 55 and recognized. In step S105, a comparison is made between the code number α indicated by the master code stored in step S103 on the one hand, and the version number β designated by the package version number retrieved in step S104 on the other hand. In step S106, a check is made to determine whether the relation of α≦β holds between the two numbers.

If in step S106 the relation of α≦β is found to hold between the two numbers, that means the integer in the packet version of the update program package to be installed this time is equal to or smaller than the integer in the package version of the currently installed program package. This, according to the rules illustrated in FIGS. 5A through 5C, is the case in which the previously acquired install key can be used to install the update program package in question. In this case, steps S107 and S108 are carried out illustratively through the use of the function of the program update processing block 63.

In step S107, processes for the update are performed using the update program package currently held in the RAM. The update program package is structured to contain the first CPU update program, second CPU update program, FPGA update program, and DSP update program, as depicted in FIG. 3. The program update processing block 63 transfers these update programs one after another to the flash memory 55 in order to overwrite the first CPU program D1, second CPU program D2, FPGA program D3, and DSP program D4 with the transferred programs respectively. In step S108, the program update processing block 63 retrieves the package version data from the update program package and overwrites the package version information field in the flash memory 55 with the retrieved data.

Following the above-described steps, the four programs are stored upgraded. The package version information is now constituted by the version number in effect after the upgrade is completed.

In parallel with steps S107 and S108, the first CPU 51 causes the HTTP server function block 61 to generate Web page data in order to display the installation dialog 100 as shown in FIGS. 6B and 6C indicating the progress of the installation (i.e., how update programs are being written to the flash memory 55). The first CPU 51 further causes the HTTP server function block 61 to carry out subsequent data transmissions.

On the other hand, if in step S106 the relation of α≦β is not found to hold between the two numbers, that means the integer in the packet version of the update program package to be installed this time is larger than the integer in the package version of the currently installed program package. In other words, this upgrade involves getting the program package version to increase to the next integer. In this case, the previously acquired install key is not sufficient for installing the update program package in question. The user needs to input a new install key corresponding to the update program package. Step S109 and subsequent steps are then carried out.

In step S109, the installation control device 33 is requested for an install key. At this point, the Web page data constituting the installation dialog 100 in FIG. 6D for install key input is sent to the installation control device 33. The installation control device 33 receives the transmitted Web page data and reproduces it using a Web browser, whereby the installation dialog 100 of FIG. 6D is displayed.

In step S110, the disk recording and reproducing apparatus 10 checks to determine if the install key in question is input. Illustratively, the user may input the install key to the install key input box 115 on the screen of the installation dialog 100 in FIG. 6D, before operating the Next Step button 113. In response, the installation control device 33 transmits the input data. The disk recording and reproducing apparatus 10 receives the input data having been transmitted. At this point, the result of the check in step S110 is affirmative and step S111 is reached accordingly.

On the other hand, it might happen that the user operates the Quit button 114 displayed in the installation dialog 100 shown in FIG. 6D. In that case, the result of the check in step S110 is negative and the procedure of FIG. 7 is brought to an end correspondingly. The display of the installation dialog 100 is then terminated illustratively by the HTTP server function block 61.

In step S111, the authentication processing block 61 carries out an authentication process using the input install key. In step S112, a check is made to determine whether the authentication is successful.

If the authentication turns out to be unsuccessful because the input install key was not correct, then the result of the check in step S112 is negative. In this case, the update is not carried out and the procedure of FIG. 7 is terminated accordingly.

If the authentication is successful because the input install key was correct, then the result of the check in step S112 is affirmative. In this case, steps S107 and S108 are reached and carried out. That is, the update is carried out through the use of the update programs.

When installation of the new programs (updates) is carried out as explained above, with the update program package suitably structured and with an appropriate algorithm devised to effect the installation, the embodiment of the invention provides the following major feature: where the package version of the update program package increases to the next decimal fraction, with the integer part of the version number kept unchanged, the previously acquired install key is allowed to be used as is for performing the update. In such a case, the user may be spared the chores of inputting the install key.

Although the description above contains much specificity, these should not be construed as limiting the scope of the invention but as merely providing illustrations of some of the presently preferred embodiments of this invention. For example, the structure of the update program package shown in FIG. 3 is for illustrative purposes. The hardware structure for executing the programs is not limited to the typical structure shown in FIG. 2. The relations between the typical CPU version numbers, package version numbers, and master code values in FIG. 4 may be changed as demanded. The manner in which the installation dialog 100 is displayed is not limited to what is shown in FIG. 6A through 6D, and the steps of the installation procedure may be varied as demanded.

The embodiment of the invention discussed above has focused on the arrangements for updating the programs of the disk recording and reproducing apparatus. However, this is not limitative of the present invention. This invention can be applied to all kinds of equipment in which at least part of their functions are implemented by executing programs.

As long as updates or data upgrades are considered the act of overwriting original unit information with new information, the storage-ready unit information discussed in connection with this invention is not limited to program data. Alternatively, other kinds of data in other forms may be handled by embodiments of the present invention.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus, comprising:
a processor, including:
a unit information acquisition section configured to newly acquire storage-ready unit information that corresponds to particular unit version information, the storage-ready unit information including one or more sub-units associated with actual version information and a structure having (i) the particular unit version information, (ii) first version range identification information representing a range of unit version information that includes the particular unit version information, and (iii) the actual version information, the actual version information being independent of the particular unit version information,
an identification information acquisition section configured to extract and acquire the first version range identification information,
a second version information acquisition section configured to read and acquire, from a predetermined storage section, second version range identification information representing a range of unit version information values that includes specific unit version information corresponding to further storage-ready unit information currently stored in said predetermined storage section,
a comparison section configured to compare said first version range identification information acquired by said identification information acquisition section, with said second version range identification information acquired by said secondary version acquisition section, and
an operation control section configured to execute, based on a result of the comparison made by said comparison section, either (a) causing said storage-ready unit information newly acquired by said unit information acquisition section to be stored into said predetermined storage section or (b) requesting input of key information for allowing said storage-ready unit information newly acquired by said unit information acquisition section to be stored into said predetermined storage section.

2. The information processing apparatus according to claim 1, wherein, if the comparison made by said comparison section determines that the value of said first version range identification information is equal to or smaller than the value of said second version range identification information, then said operation control section determines that said key information has already been acquired and store said storage-ready unit information into said storage section using said key information.

3. The information processing apparatus according to claim 1, wherein if the comparison made by said comparison section determines that the value of the first version range identification information is greater than the value of the second version range identification information, then said operation control section determines that the key information has not been acquired and requests input of the key information for allowing the storage-ready unit information newly acquired by said unit information acquisition section to be stored into said predetermined storage section.

4. An information processing method, comprising:
using a processor to carry out the following:
newly acquiring storage-ready unit information that corresponds to particular unit version information, the storage-ready unit information including one or more sub-units associated with actual version information and a structure having (i) the particular unit version information, (ii) first version range identification information representing a range of unit version information that includes the particular unit version information, and (iii) the actual version information, the actual version information being independent of the particular unit version information,
extracting and acquiring the first version range identification information,
reading and acquiring, from a predetermined storage section, second version range identification information representing a range of unit version information values that includes specific unit version information corresponding to further storage-ready unit information and which is currently stored in said predetermined storage section,
comparing the acquired first version range identification information with the acquired second version range identification information, and
executing, based on a result of the comparison made in said comparing step, either (a) causing the newly acquired storage-ready unit information to be stored into said predetermined storage section, or (b) requesting input of key information for allowing said newly acquired storage-ready unit information to be stored into said predetermined storage section.

5. The method according to claim 4, wherein if the comparison made by said comparing step determines that the value of the first version range identification information is equal to or smaller than the value of the second version range identification information, then said executing step determines that the key information has already been acquired and stores the storage-ready unit information into said storage section using the key information.

6. The method according to claim 4, wherein if the comparison made by said comparing step determines that the value of the first version range identification information is greater than the value of the second version range identification information, then said executing step determines that the key information has not been acquired and requests input of the key information for allowing the newly acquired storage-ready unit information to be stored into said predetermined storage section.

7. A hardware processor encoded with a computer program when executed causes a computer to execute the following method steps:
newly acquiring storage-ready unit information that corresponds to particular unit version information, the storage-ready unit information including one or more sub-units associated with actual version information and a structure having (i) the particular unit version information, (ii) first version range identification information representing a range of unit version information that includes the particular unit version information, and (iii) the actual version information, the actual version information being independent of the particular unit version information;
extracting and acquiring the first version range identification information;
reading and acquiring, from a predetermined storage section, second version range identification information representing a range of unit version information values that includes specific unit version information corresponding to further storage-ready unit information and which is currently stored in said predetermined storage section;

comparing the acquired first version range identification information with the acquired second version range identification information; and executing, based on a result of the comparison made in said comparing step, either (a) causing the newly acquired storage-ready unit information to be stored into said predetermined storage section, or (b) requesting input of key information for allowing said newly acquired storage-ready unit information to be stored into said predetermined storage section.

* * * * *